US012784208B2

(12) United States Patent
Schwarz et al.

(10) Patent No.: US 12,784,208 B2
(45) Date of Patent: Nov. 3, 2026

(54) APPARATUSES, SYSTEMS, AND METHODS FOR GENERATING COMPOSITE DISPLAYS OF ORAL AREAS

(71) Applicant: DENTSPLY SIRONA Inc., York, PA (US)

(72) Inventors: Michael Schwarz, Darmstadt (DE); Daniel Bielser, Steffisburg (CH)

(73) Assignee: Dentsply Sirona Inc., York, PA (US)

( * ) Notice: Subject to any disclaimer, the term of this patent is extended or adjusted under 35 U.S.C. 154(b) by 186 days.

(21) Appl. No.: 18/753,387

(22) Filed: Jun. 25, 2024

(65) Prior Publication Data

US 2025/0391016 A1 Dec. 25, 2025

(51) Int. Cl.
*G06T 7/00* (2017.01)
*G06T 19/20* (2011.01)

(52) U.S. Cl.
CPC ............ *G06T 7/0012* (2013.01); *G06T 19/20* (2013.01); *G06T 2207/10116* (2013.01); *G06T 2207/30036* (2013.01)

(58) Field of Classification Search
CPC ................................ G06T 7/0012; A61B 6/51
See application file for complete search history.

(56) References Cited

U.S. PATENT DOCUMENTS

| | | | | |
|---|---|---|---|---|
| 11,978,203 | B2 * | 5/2024 | Kim | G06T 7/0012 |
| 2024/0122463 | A1 * | 4/2024 | Li | A61B 1/24 |
| 2024/0366171 | A1 * | 11/2024 | Tyutyunnik | A61B 6/5247 |

FOREIGN PATENT DOCUMENTS

| | | |
|---|---|---|
| EP | 4575994 | 6/2025 |

OTHER PUBLICATIONS

Baan et al. "Fusion of intra-oral scans in cone-beam computed tomography scans", Clinical Oral Investigations (2021) 25:77-85. (Year: 2021).*

"European Application Serial No. 25185000.4, Extended European Search Report mailed Oct. 17, 2025", 10 pgs.

Chung, Minyoung, "Automatic Registration Between Dental Cone-Beam CT and Scanned Surface via Deep Pose Regression Neural Networks and Clustered Similarities", IEEE Transactions On Medical Imaging, vol. 39, No. 12, Jul. 4, 2020, 9 pgs.

Lin, Hsiu-Hsia, "Artifact-Resistant Superimposition of Digital Dental Models and Cone-Beam Computed Tomography Images", Journal of Oral And Maxillofacial Surgery, vol. 71, No. 11, Aug. 1, 2013, 1933-1947.

* cited by examiner

*Primary Examiner* — Casey Bryant
(74) *Attorney, Agent, or Firm* — SCHWEGMAN LUNDBERG & WOESSNER, P.A.

(57) ABSTRACT

Apparatuses, systems, and methods are provided for generating composite displays of oral areas. To generate the composite display, X-ray image data from an X-ray scan of an oral area of an individual and a three-dimensional model generated from a three-dimensional scan of the oral area of the individual are used. The X-ray image is correlated to a rendering generated from the three-dimensional model in the composite display such that structures in the X-ray image are matched to structures in the rendering.

20 Claims, 7 Drawing Sheets

APPARATUSES, SYSTEMS, AND METHODS FOR GENERATING COMPOSITE DISPLAYS OF ORAL AREAS

BACKGROUND

Field of the Invention

Embodiments of the invention relate to apparatuses, systems, and methods that generate composite displays of oral areas.

Related Art

Dental professionals rely on displays of oral areas in their practice. Two types of representations that can be displayed and are particularly useful are X-ray images and three-dimensional scans. X-rays provide detailed images of teeth, jaws, and surrounding structures, enabling dental professionals to diagnose conditions such as tooth decay, bone health, and alignment issues. Three-dimensional scans provide dental professionals with a three-dimensional representation showing the teeth, jaws, and surrounding structures, offering insights into dental anatomy, gum disease, and tooth positioning.

Both X-rays and three-dimensional scans thereby provide valuable information to a dental professional that may be used when evaluating or treating a patient. Because they provide different types of information, in many instances the dental professional will want to view displays of an X-rays image and three-dimensional scans of the same oral area simultaneously. However, current systems do not provide for a composite display of an X-ray image and a three-dimensional scan together. And even if the two types of representations are viewed side-by-side, the dental professional must mentally correlate common structures shown in the two representations. Such an exercise is imprecise and prone to errors even for an experienced dental professional.

SUMMARY OF THE INVENTION

According to one embodiment of the invention, an apparatus provides a composite display of an oral area. The apparatus includes at least one processor configured to read out and execute instructions stored in at least one memory to thereby cause the apparatus to function as a receiving unit configured to receive X-ray image data that was generated from an X-ray scan of an oral area of an individual and a three-dimensional model that was that was generated from a three-dimensional scan of the oral area of the individual, and a composite display generation unit configured to generate a composite display of the oral area that includes an X-ray image generated from the X-ray data and a three-dimensional model.

According to another embodiment, a method is provided for generating a composite display of an oral area. The method includes receiving X-ray image data generated from an X-ray scan of the oral area and receiving three-dimensional image model generated from a three-dimensional scan of the oral area. A composite display of the oral area is generated, with the composite display including an X-ray image generated from the X-ray data and a three-dimensional model. The composite display is displayed.

According to a further embodiment, a method is provided for generating a composite display of an oral area. The method includes receiving X-ray image data generated from an X-ray scan of the oral area and receiving three-dimensional model generated from a three-dimensional scan of the oral area. The method further includes correlating the X-ray image and the three-dimensional model such that structures in the X-ray image are matched to corresponding structures in the three-dimensional model. A composite display of the oral area that includes the X-ray image and the model is generated, and the composite display is displayed.

DETAILED DESCRIPTION OF THE INVENTION

Embodiments of the invention will now be described. The embodiments include apparatuses, systems, and methods that generate composite displays of oral areas.

Figure 1:
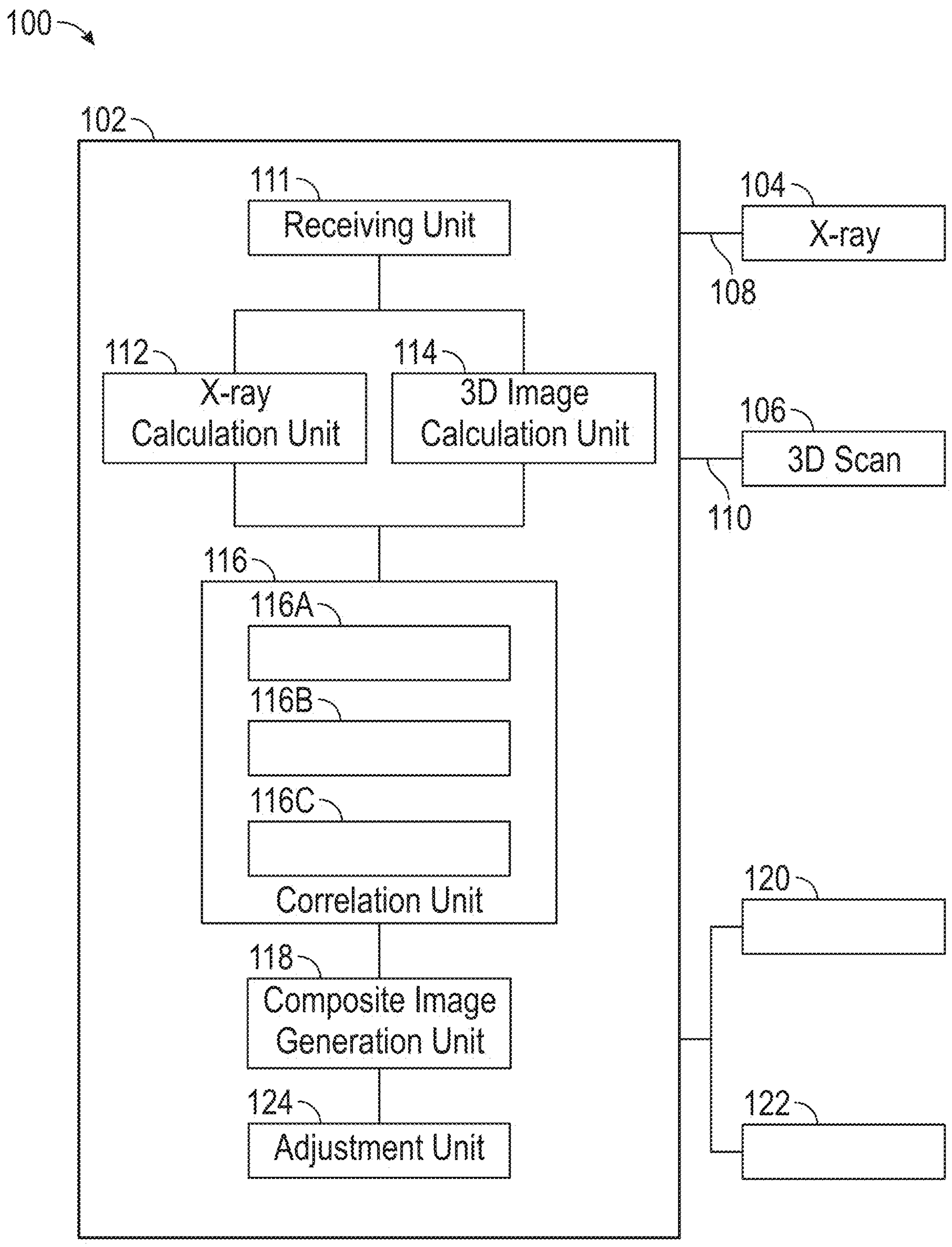
FIG. 1 is a conceptual view of system according to an embodiment of the invention.

FIG. 1 shows a system 100 according to embodiments of the invention. The system includes a computer 102, an X-ray generating system 104, and a three-dimensional scanning system 106. As will be described below, the X-ray generating system 104 and the three-dimensional scanning system 106 provide data to the computer 102, which correlates the two types of data and generates a composite display showing the X-ray image and a representation generated from the three-dimensional scan together.

Those skilled in the art will recognize different types of dental X-ray machines and techniques that can be used in embodiments of the invention. For example, the X-ray generating system 104 could be embodied as an intra-oral system. One such widely used intra-oral system is known as a bitewing, where the patient bites down on a holder containing a film or a digital sensor in the mouth, and the X-ray generating machine, which positioned outside the patient's mouth, emits a focused beam that penetrates the teeth and surrounding structures. The X-ray data is thereby generated in the film or digital sensor. Another widely used X-ray generating system is a panoramic X-ray system wherein a machine rotates about the patient's head and captures a continuous image of the entire oral cavity. As is evident from the disclosure herein, bitewing, panoramic, and other X-ray systems to be used to generate X-ray data in embodiments of the invention.

Those skilled in the art will also recognize different types of three-dimensional surface scanning machines and techniques that can be used in conjunction with embodiments of the invention. One type of three-dimensional scanning system is an intraoral device, often referred to as a DI scanner, that can include a handheld scanner that projects light onto dental surfaces in the oral cavity and captures the reflected light to create highly detailed three-dimensional digital impressions. Other types of three-dimensional scanning systems use a cone beam computed tomography (CBCT) machine, which rotates around a patient's head to capture data to form three-dimensional models of oral areas. Representations that can be displayed may be calculated from the model data generated by DI scanner, CBCT machine, or other system.

The computer 102 that receives the X-ray data from the X-ray generating system 104 and the three-dimensional scanning data from the three-dimensional scanning system 106 may be a general or special purpose computer. Such computers will typically include a central processing unit (CPU) that includes at least one processor. Such computers will also typically include additional processing structures, such as graphical processor of a graphical processing unit (GPU). The one or more processors are coupled to one or more memory structures, which may be random access memory (RAM) devices, cache memories, non-volatile or backup memories, read-only memories, etc. In addition, memory may be considered to include memory storage physically located elsewhere in computer, e.g., any cache memory in a processor, as well as any storage capacity used as a virtual memory, e.g., as stored in a mass storage device or in another computer coupled to the computer 102.

The computer 102 will also typically include at least one communication interface comprising a number of input and output components for communicating with external devices. Such a communication interface can be provided with a wide variety of technologies. The communication interface components may be operable to couple the computer 102 to a network or devices. For example, the communication interface may include wired communication components, wireless communication components, cellular communication components, Near Field Communication (NFC) components, BLUETOOTH® components, WIFI® components, and other communication components to provide communication via other modalities. In embodiments of the invention, input and/or output components of the communication interface provide for communication to the x-ray generating system 104 and the three-dimensional scanning system 106 through the operative links 108 and 110.

The computer 102 further includes a data storage device. The data storage device is configured to record data persistently, where "persistently" or "persistent" refers as to a device's ability to maintain recorded data after loss of power. In some embodiments, the data storage device may correspond to non-disk storage media. For example, the data storage device may be one or more solid-state drives (SSDs), flash memory-based storage, any type of solid-state non-volatile memory, or any other type of non-mechanical storage device. In other implementations, the data storage device may include mechanical or spinning hard disk, such as hard-disk drives (HDD).

As an alternative to including the data storage device, or in addition to the data storage device, in embodiments the computer 102 is operatively linked to a data storage device that is physically separated from the structure of computer 102. For example, an input/output component of the communication interface of the computer 102 may be connected to a network through which the computer 102 receives data from an external data storage device.

It should be noted that a distributed computer system could be used to provide the functions of the computer 102 described herein. One example of a distributed computer system is a cloud-based architecture. As will be appreciated by those skilled in the art, cloud computing is the delivery of services-such as servers, storage, databases, networking, software, analytics, and intelligence over the internet ("the cloud"). As an example of a cloud computing embodiment of the invention, a server computer could receive the data from the X-ray generating system 104 and the three-dimensional scanning system 106, and the computer 102 could be client that accesses the data from the server.

The computer 102 includes a user interface 122 incorporating one or more user input devices (e.g., a keyboard, a mouse, a trackball, a joystick, a touch pad, and/or a microphone, among others) and a display device 120 (e.g., an LCD display panel). The user interface 122 and/or display device 120 allows a user to control operation of the computer and view analyses and assessments of data, as described herein. In other embodiments, the computer 102 is operatively linked to another device providing such a user interface. For example, the computer 102 may be connected to a network to which a remote workstation with a user interface is provided. Still other embodiments of the invention may combine functions of the user interface 122 and the display device 120, such as in a touch-screen device.

The computer 102 operates under the control of an operating system and executes or otherwise relies upon various computer software applications, components, programs, objects, units, data structures, etc., as will be described in greater detail below. Moreover, various applications, components, programs, objects, units, etc. may also execute on one or more processors in another computer coupled to computer 102 via a network, e.g., as in a distributed computer system, whereby the processing required to implement the functions of a computer program may be allocated to multiple computers over a network.

The computer 102 may include a computer aided diagnostic program to implement one or more of the steps of the processes described herein. For the purposes of implementing such steps, an image database, storing medical image scans, may be implemented in computer 102 in the data storage device or in another data storage device that is operatively linked to the computer 102. It will be appreciated, however, that some steps in the processes described herein may be performed manually and with or without the use of the computer 102.

The operative links 108 and 110 provided between the computer 102 and the X-ray generation system 104 and the three-dimensional scanning system 106 allow the computer 102 to receive data from the systems 104 and 106. In further embodiments, the computer 102 includes a software unit or units enabling the user to control operation of the systems 104 and 106 through the operative links 108 and 110. The imaging systems 104 and 106 and the computer 102 may be formed with a direct physical connection such that the operative links 108 and 110 are in the form of a wire structure that transmits the data and/or control commands between the computer 102 and the systems 104 and 106. In other embodiments, the systems 104 and 106 and the computer 102 are connected through a network, such as local area network (LAN), a wireless local area network (WLAN), or through the Internet. Those skilled in the art will appreciate the wide variety of ways that the systems 104 and 108 and the computer 102 may be operatively linked.

In still other embodiments, the X-ray generation system 104 and/or the three-dimensional scanning system 106 and the computer 102 are provide as a singular hardware structure. That is, the computer 102 is directly built into the X-ray generation system 104 and/or the three-dimensional scanning system 106. Thus, the operative link(s) between the computer 102 and the systems 104 and 106 are formed by components of the singular structure.

It should be noted that in still further embodiments of the invention, the data to be analyzed by the computer 102 is not received directly from the X-ray generation system 104 and/or the three-dimensional scanning system 106. For example, the data may be generated using a system, and the data may then be saved in an external storage device linked to the computer 102 (e.g., through a network). Thus, at any time following the scan(s) that generates the X-ray data and three-dimensional scanning data, the computer 102 may receive the previously generated data from the external storage device.

Embodiments of the invention include functional units that reside in memory device(s) of the computer 102. Each of the units is computer-executable code that, when executed by the computer's processors, imparts the unit's functionality to the computer 102. Those skilled in the art will recognize the coding languages and techniques that may be used to create the units.

In the embodiment depicted in FIG. 1, the computer 102 includes a receiving unit 111 that receives data from the X-ray generation system 104 and the three-dimensional scanning system 106. Note, as discussed above, although the embodiment depicted in FIG. 1 shows the computer 102 directly receiving the data from the X-ray generation system 104 and three-dimensional scanning system 106 through the operative links 108 and 110, in other embodiments one or more systems may be provided in the connection between the computer 102 and the systems 104 and 106. For example, the X-ray generation and three-dimensional scanning systems 104 and 106 could be linked to one or more intermediary systems that store the data generated by the systems 104 and 106.

The computer 102 includes an X-ray image generation unit 112 that calculates X-ray images from the X-ray image data that is received by the computer 102. The computer 102 also includes a three-dimensional model generation unit 114 that calculates a three-dimensional model from the three-dimensional scanning data that is received by the computer 102. Those skilled in the art will recognize the techniques that can be used to calculate X-ray images and three-dimensional models from corresponding data.

The computer 102 further includes a correlation unit 116 and a composite display generation unit 118 that generate composite displays that each include at least one X-ray image calculated by the X-ray image generation unit 112 and a three-dimensional model calculated by the three-dimensional model generation unit 114. In the correlation unit 116, structures depicted in the one or more X-ray images are aligned to corresponding structures in the three-dimensional model using techniques and processes as described below. The composite display generation unit 118 then generates the composite display with the X-ray image and the three-dimensional model in the alignment determined by the correlation unit 116. The resulting composite display can be output, for example, to a display device 120 for viewing by a user. The composite display can also be saved in a storage device in or connected to the computer 102.

Figure 2:
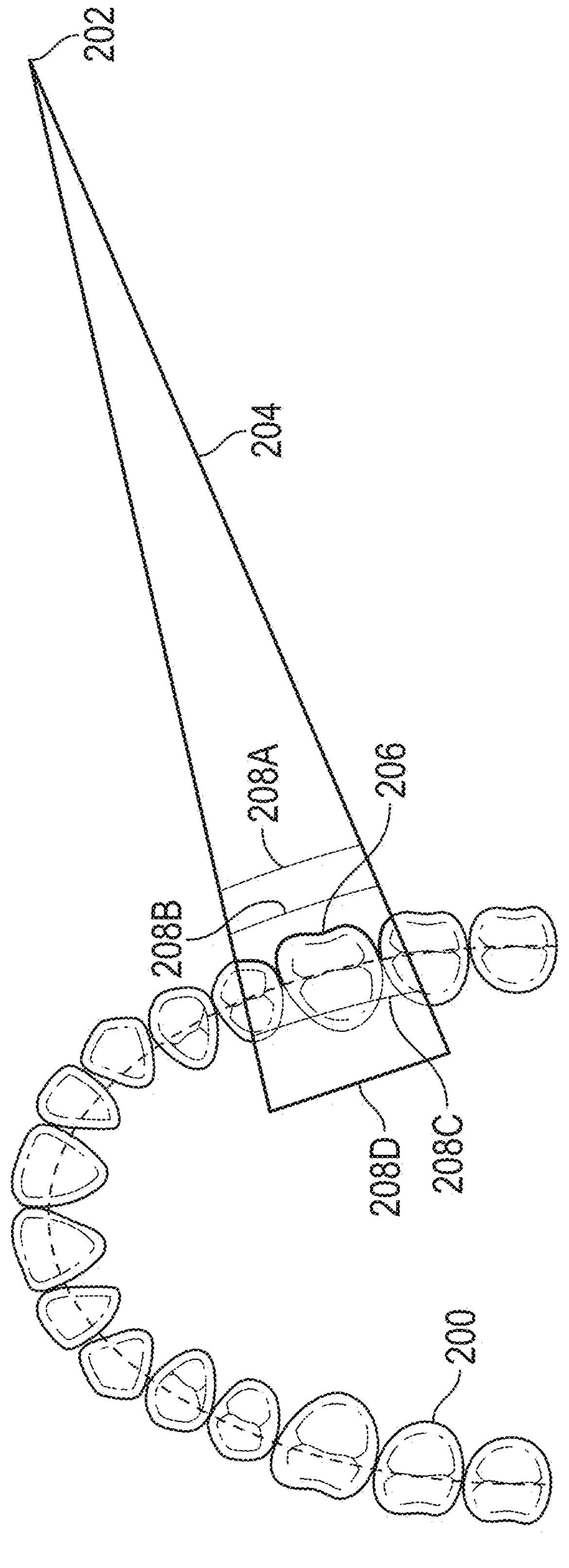
FIG. 2 shows potential placement of a dental X-ray image relative to a three-dimensional scan in a composite display of an oral area.

FIG. 2 shows possible locations for placement of a dental X-ray image relative to a three-dimensional model in a composite display of an oral area according to embodiments of the invention. This figure shows a top view of teeth 200 in the model generated from the three-dimensional surface scan. Point 202 represents the X-ray source and 204 represents the frustum of the X-ray beam emanating from the X-ray source 202. Five potential locations 206 and 208A-208D for positioning of the X-ray image relative to the teeth 200 are shown in the figure, but other positions may be used in further embodiments of the invention. The locations 206 and 208A-208D define, in essence, surfaces where the X-ray image data is positioned in the composite display. Location 206 follows along the front/outer surface of the teeth 200. Locations 208A and 208B are positioned in front of the front/outer surface of the teeth 200. Location 208C is located within the teeth 200. And location 208D is located behind the teeth 200. Note that depending on the distance of the locations 206 and 208A-208D from the X-ray source 202 and each location's offset from the center line of the jaw of the teeth 200, the extents of the surfaces at locations 206 and 208A-208D are varied to fill the extent of X-ray frustum 204 at the location.

Figure 3:
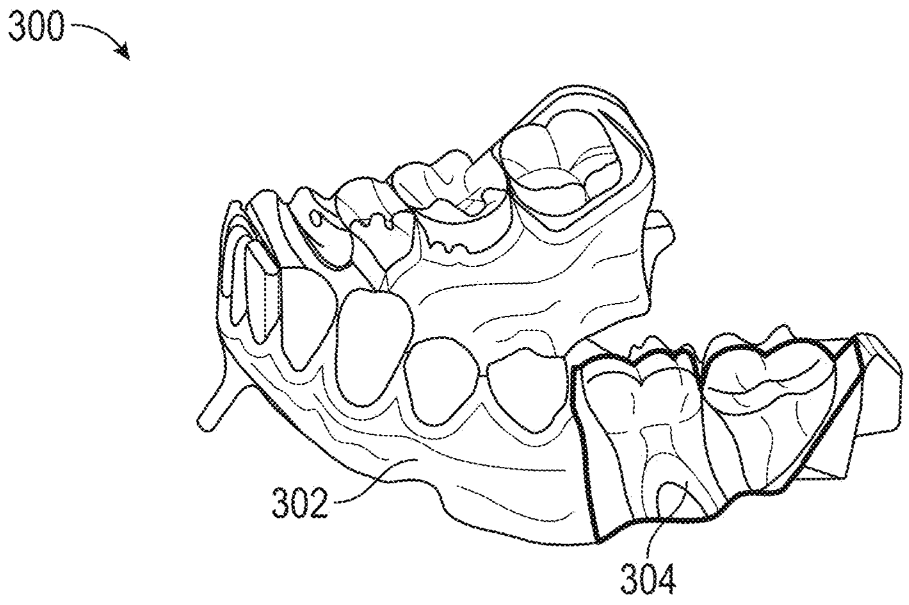
FIG. 3 is an illustration of a composite display of an oral area according to an embodiment of the invention.

FIG. 3 is a composite display 300 that includes a three-dimensional model of an oral area 302 and an X-ray image 304 of the same oral area. In this case, the X-ray image 304 is positioned relative to the model 302 at a location corresponding to position 206 in FIG. 2. The region depicted in the X-ray image 304 overlaps the model 302 such that the structures shown in the X-ray image 304 are aligned with the corresponding structures shown in the model 302. This correlation between the image 304 and the model 302 can be determined using the techniques and processes described below.

Figure 4:
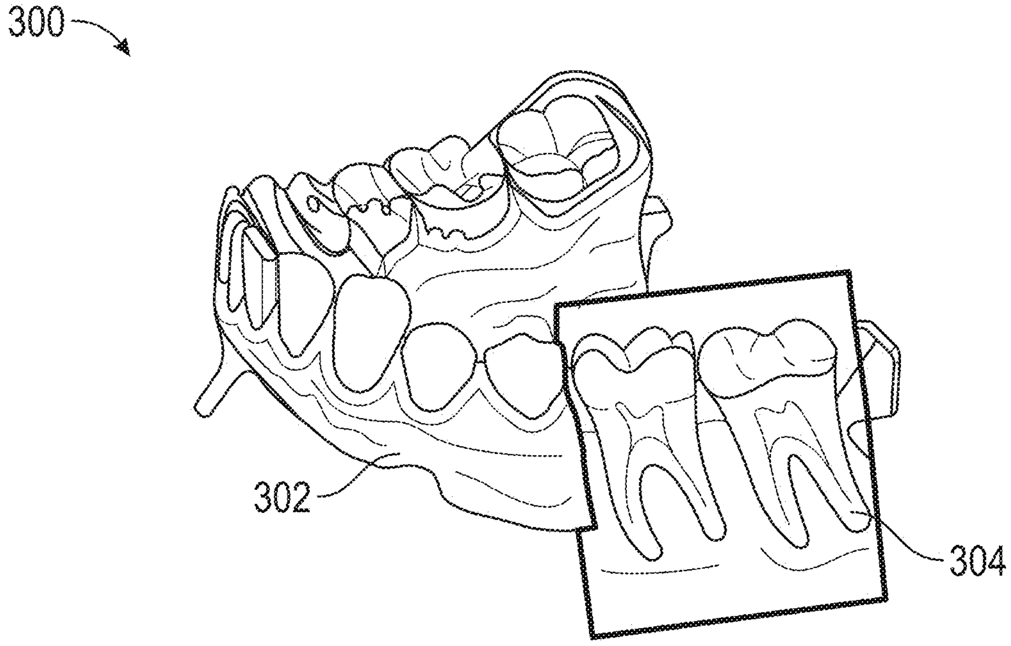
FIG. 4 is an illustration of a composite display of an oral area according to another embodiment of the invention.

FIG. 4 is another view of the composite display 300. In this case, the X-ray image 304 is positioned relative to the model 302 at a location corresponding to the position 208C in FIG. 2. In this view, the portion of the the three-dimensional model 302 in front of the X-ray image 304 has been removed (i.e., made completely transparent) such that the X-ray image 304 is unobstructed. According to embodiments of the invention, a user can adjust the opacities of the X-ray image(s) and the three-dimensional model in a composite display as desired.

It should be noted that while the composite displays 300 and 400 in FIG. 3 and FIG. 4 each include one X-ray image and one three-dimensional model, in other embodiments of the invention more than one X-ray image and/or more than one model may be included in a composite display. For example, two X-ray images showing different parts of an oral area can be formed into a composite display with a model of the oral area, with the two X-ray images being aligned to different parts of the model.

Techniques according to embodiments of the invention for correlating an X-ray image and a three-dimensional model to form a composite display will now be described.

As noted above, a correlation unit 116 is used in embodiments of invention to align structures shown in the X-ray image with corresponding structures in a rendering of the three-dimensional model. The correlation unit 116 includes an X-ray edge determination unit 116A, a rough correlation unit 116B, and a fine correlation unit 116C. As will be described below, these units determine and then match edges (also referred to as "contours") of structures in the X-ray image with silhouette edges of structures in a rendering of the three-dimensional model.

Figure 5A:
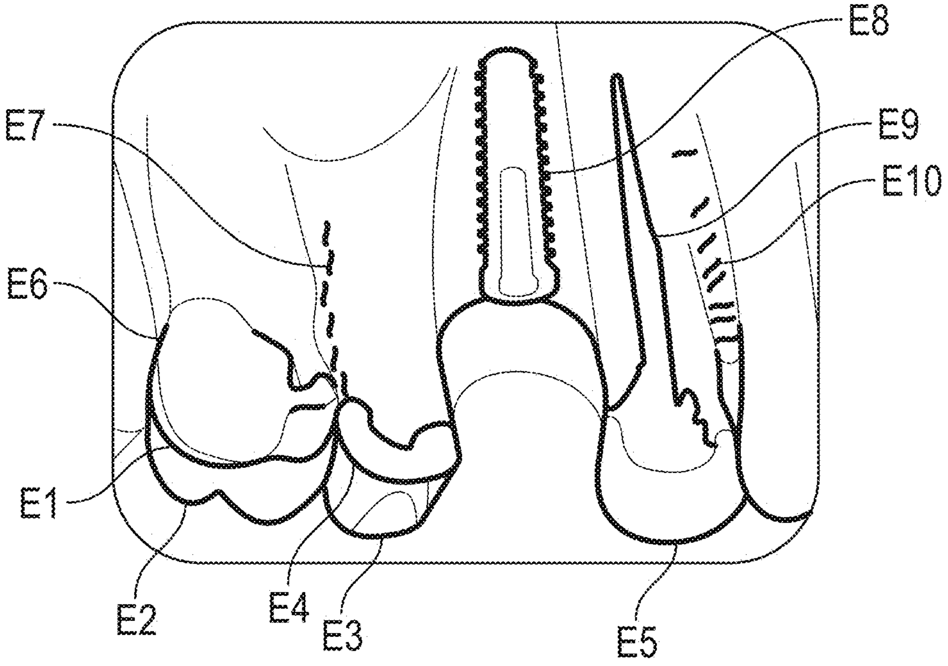
FIGS. 5(*a*) and 5(*b*) show views contours that are determined in an X-ray image of an oral area.
Figure 5B:
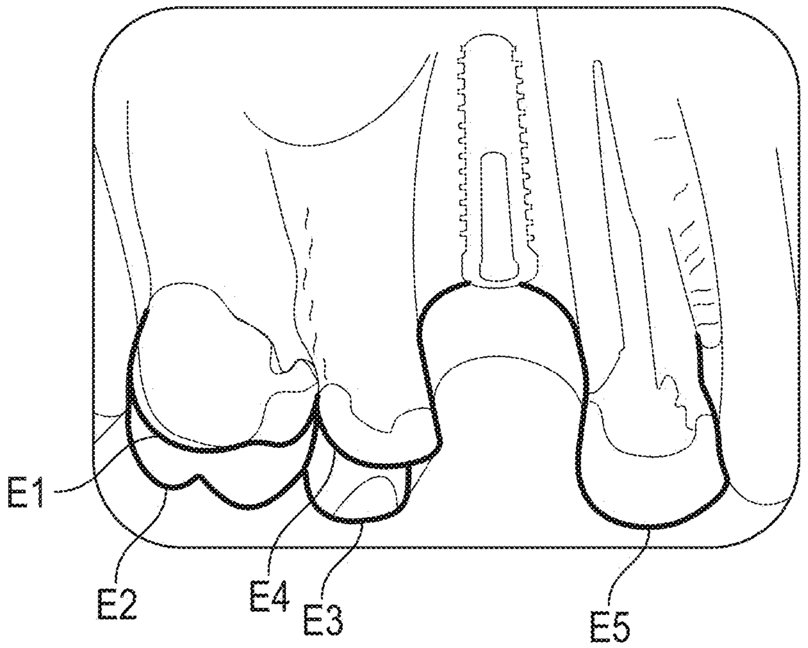

The X-ray edge determination unit 116A locates edges in the X-ray image that may be matched to silhouette edges in the rendering of the three-dimensional model. In some embodiments of the invention, the unit 116 locates the possible matching edges in two steps: first the unit 116A makes an initial determination of a number of possible edges in the X-ray image, and second the unit 116A eliminates identified edges that will likely not be useful in the matching with the silhouette edges of rendering of the three-dimensional model. The X-ray edge determination unit 116A thereby determines a subset of edges of structures in the X-ray image that can potentially be matched to edges in the rendering of the three-dimensional model. FIG. 5(*a*) shows an initial determination of edges E1-E10 in an X-ray image of teeth, and FIG. 5(*b*) shows the edge as E1-E5 that the X-ray edge determination unit 116A determines may be useful for correlating to the silhouette edges in the rendering of the three-dimensional model. In general, the useful edges are local maximum edges where the teeth surfaces reach their maximum height from the given viewpoint. Note that not all the depicted edges are marked with reference lines/numerals in the figures. The edges E1-E4 follow the outer contours of the teeth, jaw, and spaces between the teeth, and, thus, the edges E1-E4 can potentially be matched to corresponding silhouette edges in the rendering of the three-dimensional model. On the other hand, the edges E5-E8 are such that it is unlikely that they can be matched to corresponding silhouette edges in the three-dimensional. Edges, such as the edges E1-E4, cannot be potentially matched, for example, when they are too short, are parts of an implant in the jaw, or are artifacts from the outline of the digitized analog X-ray film.

The X-ray edge determination unit 116A may be trained to automatically identify potentially useful edges for the subset of edges that could possibly be matched to silhouette edges in the X-ray image by using artificial intelligence techniques, such as machine learning. For example, the X-ray edge determination unit 116A can be trained using labeled data to develop an algorithm employed by the X-ray edge determination unit 116A to recognize useful edges in the X-ray images. By providing the algorithm with examples of labeled useful edges, a machine-learning process can enable the X-ray edge determination unit 116A to identify useful edges. Through iterative adjustments to its internal parameters based on the labeled data, the X-ray edge determination unit 116A will become increasingly proficient at accurately categorizing useful edges. Those skilled in the art will recognize machine-learning techniques and processes, as well as other means for allowing an X-ray edge determination unit to identify useful edges according to embodiments of the invention.

In addition to, or in alternative to, the X-ray edge determination unit 116A automatically identifying useful edges, the unit 116A may be configured to receive a designation of useful edges from a user. In such a case, the user may view the X-ray image displayed on a display unit provided to the user, and the user may indicate potentially useful edges.

The rough correlation unit 116B provides a rough match between the X-ray image and the three-dimensional model. The rough correlation unit 116B establishes the rough match using one or more of known parameters of the X-ray imaging and matchings of individual teeth in the X-ray images to corresponding teeth in the three-dimensional model. With respect to known parameters, the rough correlation unit 116B can use metadata from the X-ray image indicating parameters of the projection frustum (position, direction, focus angle) to establish a rough initial match between the X-ray image and the three-dimensional model. For example, when a bitewing system is used to generate the X-ray image, often the spatial extent of the detection sensor, its approximate positioning relative to the jaw, the distance range between the X-ray source and the sensor will be available, and the direction from the sensor to the X-ray source will be available. Such information limits the search space in the three-dimensional model to primarily finding the correspondence on a line along the jaw. Alternatively, the search along the jaw curve could be done, for example, using feature matching or a grid-like search strategy.

In addition to using information from the X-ray imaging process, the rough correlation unit 116B can also determine the rough match by segmenting individual teeth and their tooth numbers both in the X-ray image and the three-dimensional model, and then superimposing corresponding teeth in the image and model. To do this, the rough correlation unit 116B may use an algorithm to segment the jaw line as well as all of the individual teeth along the jaw line in the three-dimensional model. Similarly, an algorithm can be used to identify individual teeth with their tooth numbers in the X-ray image. For identifying the teeth in both types of representations (image and model), the algorithms can be based on artificial intelligence techniques, such as machine learning. Such techniques may yield a bounding box for each identified tooth in the X-ray image and three-dimensional model. The rough match is thereafter obtained by matching the bounding box for one or more teeth in the X-ray image to the bounding box for the corresponding one or more teeth in the three-dimensional model.

In further embodiments of the invention, the user may provide input as to the rough match between the X-ray image and the three-dimensional model. To do so, the image(s) and rendering(s) from the three-dimensional model can be displayed on a display. Using an interface, the user can move, rotate, and scale the image to establish a view where the X-ray image and the rendering roughly match.

Figure 6A:
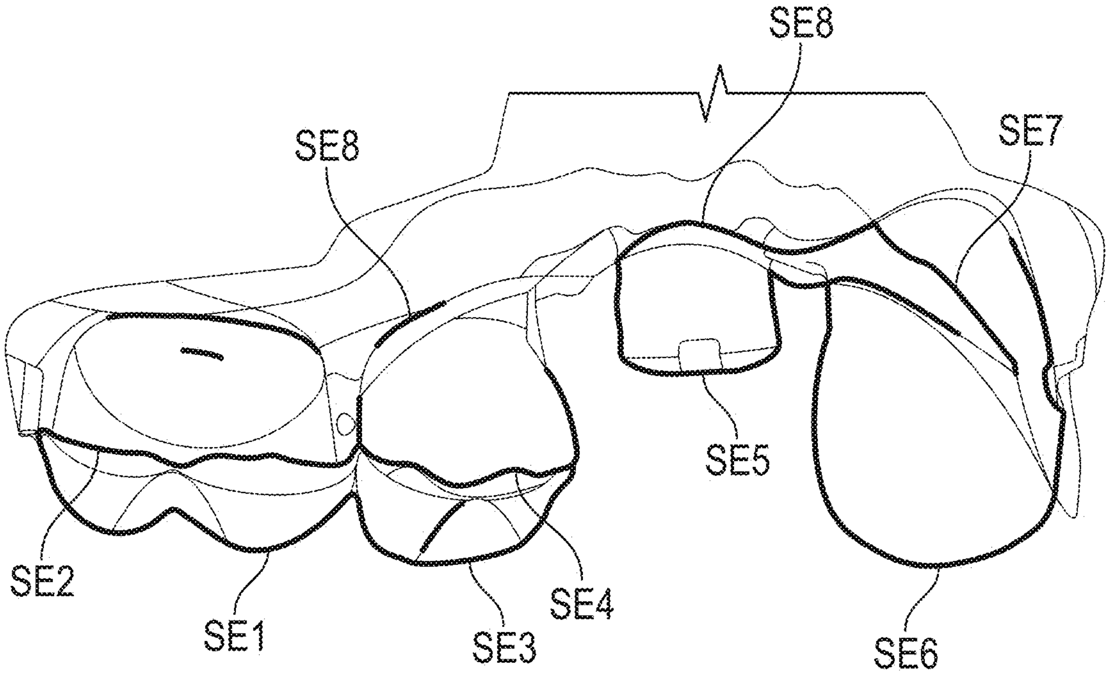
FIGS. 6(*a*) and 6(*b*) show views of silhouette edges that are determined in a rendering from a three-dimensional model of an oral area.
Figure 6B:
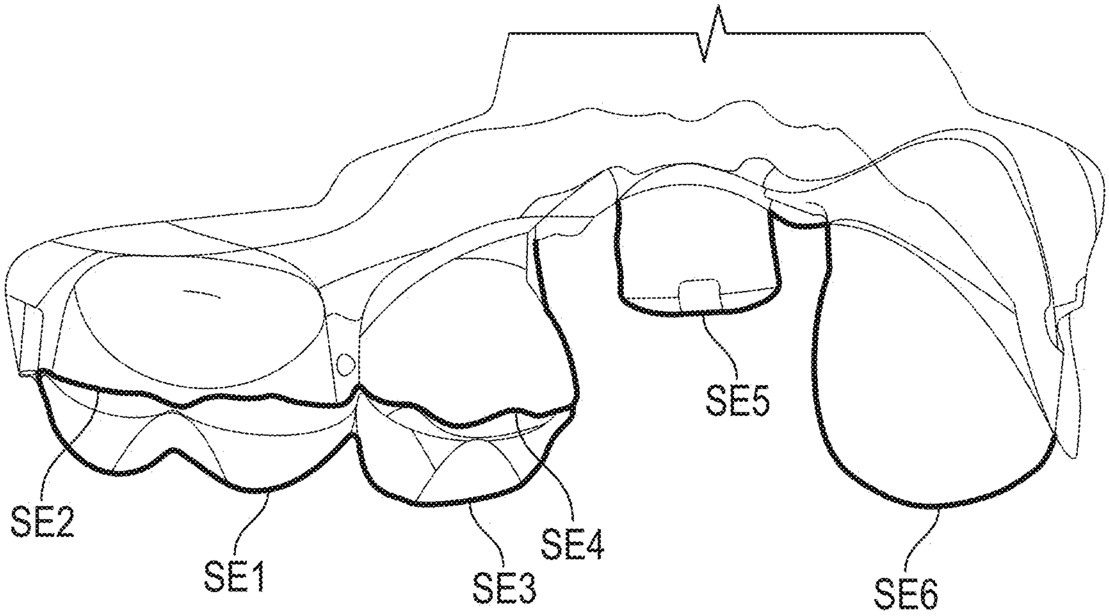

From the rough correlation formed by the rough correlation unit 116B or by the user, the fine correlation unit 116C progressively refines the correlation between the projected X-ray image and the three-dimensional model by adjusting the approximated X-ray image projection onto the three-dimensional model until a satisfactory composite display can be formed. To do this, in iterative steps the fine correlation unit 116C first determines silhouette edges from the current view of the three-dimensional model given the current approximate position of the X-ray image. The fine correlation unit 116C then selects candidate silhouette edges from amongst the determined silhouette edges to form a subset of edges that can potentially be matched to edges in the X-ray image. FIGS. 6(*a*) and 6(*b*) show several silhouette edges SE1-SE8 in a rendering from a three-dimensional model of an oral area. Note that not all the silhouette edges are marked with a reference number in FIGS. 6(*a*) and 6(*b*). The silhouette edges SE1-SE4 are candidates that can potentially be used in the correlation to edges in the X-ray image that are identified by the X-ray edge determination unit 116A. The silhouette edges SE5-SE8 are discarded for not being candidates because they would likely not be matched to edges in the X-ray image. The criteria for discarding silhouette edges can be, for example, that the edges are too short, too small, too far from the highest point of the closest tooth, too interior (determined as being a certain distance towards the jaw area from the other edges).

To correlate the subset of silhouette edges from the rendering of the three-dimensional model and the subset of edges in the X-ray image, the fine correlation unit 116C selects points from the candidate silhouette edges and determines the closest point in the edges in the X-ray image within a given maximum search radius within the roughly match. The maximum search radius can be a fixed value that is empirically determined. If no corresponding point in an edge area in the X-ray image can be found for a particular selected point from the candidate silhouette edges, then the selected point is discarded. Alternatively, the correlation could be performed with a reverse process wherein edges in the X-ray image are selected and closest points from the candidate silhouette edges are determined within a maximum search radius.

Figure 7:
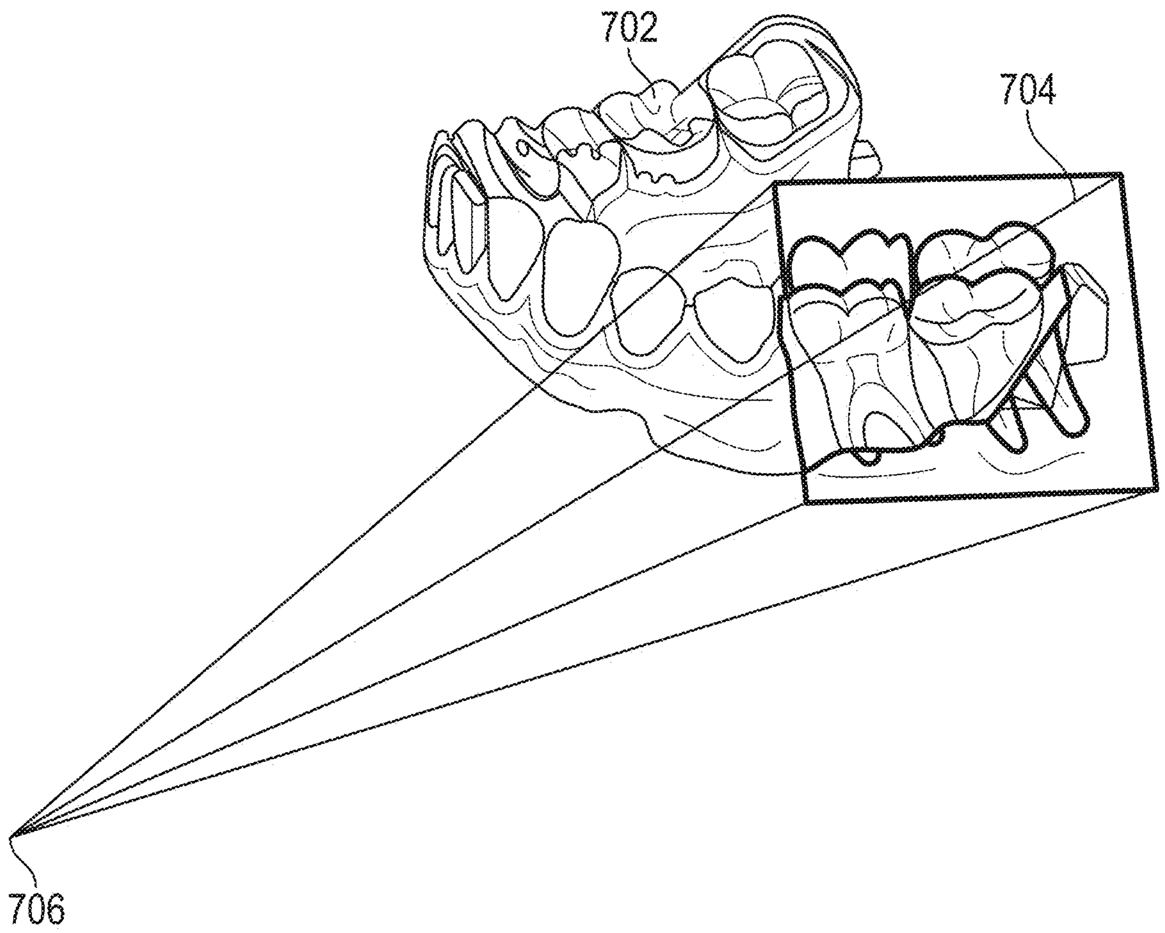
FIG. 7 shows a view of correspondence between an X-ray image and a three-dimensional model of an oral area in relation to the X-ray source and a frustum of the X-ray.

Once correspondences have been found between points from the candidate silhouette edges and points in the edges in the X-ray image, an optimization algorithm is used to closely match the silhouette edges and the edges in the X-ray image. The parameters to be optimized are the virtual position of the X-ray source, the viewing direction, and the focal length. FIG. 7 is a conceptual view showing a virtual position of a X-ray source 706, a viewing direction D, and a focal length L for a virtually positioned X-ray image. The error measure that drives the optimization is a distance measure between the correspondences of candidate silhouette and X-ray image edge points. In some embodiments of the invention, the optimization algorithm follows the Gauss-Newton method. In this method, for each correspondence of a point in a silhouette edge and a point in an edge of the X-ray image, a two-dimensional residual and the residual's Jacobian is determined with respect to all parameters are determined, and a parameter update that minimizes the sum of the squared residuals is computed and applied. If the resulting total reprojection error is below a threshold, the fine correlation ends and the composite image is completed. If the resulting error is above a threshold, a new iteration of the algorithm is started. Those skilled in the art will recognize alternative optimization algorithms that can be used in embodiments of the invention.

With the fine correlation between the X-ray image and the three-dimensional model having been generated by the fine correlation unit 116C, the viewable composite display with the correlation is generated by the composite display generation unit 118. In the composite display, structures of oral area in the X-ray image are aligned with the same structures in a rendering from the three-dimensional model. Thus, the composite display provides a highly useful view of the oral area that a dental professional can use in the evaluation and treatment of a patient.

The composite display can be viewed by the dental professional, for example on the display device 120. In addition, or in alternative, the composite display can be saved in a memory. According to embodiments of the invention, an adjustment unit 124 is provided to allow the user to make changes to the view of the composite display. For example, the adjustment unit 124 can receive instructions from the user changing the transparencies of the X-ray image and/or the three-dimensional model in the composite display. The adjustment unit 124 could also receive instructions for changing the positioning of the X-ray image relative to the model in the composite display. As still further examples, the adjustment unit 124 can receive instructions from the user to change the angle at which the composite display is displayed or to zoom in on specific areas of the composite display.

Figure 8:
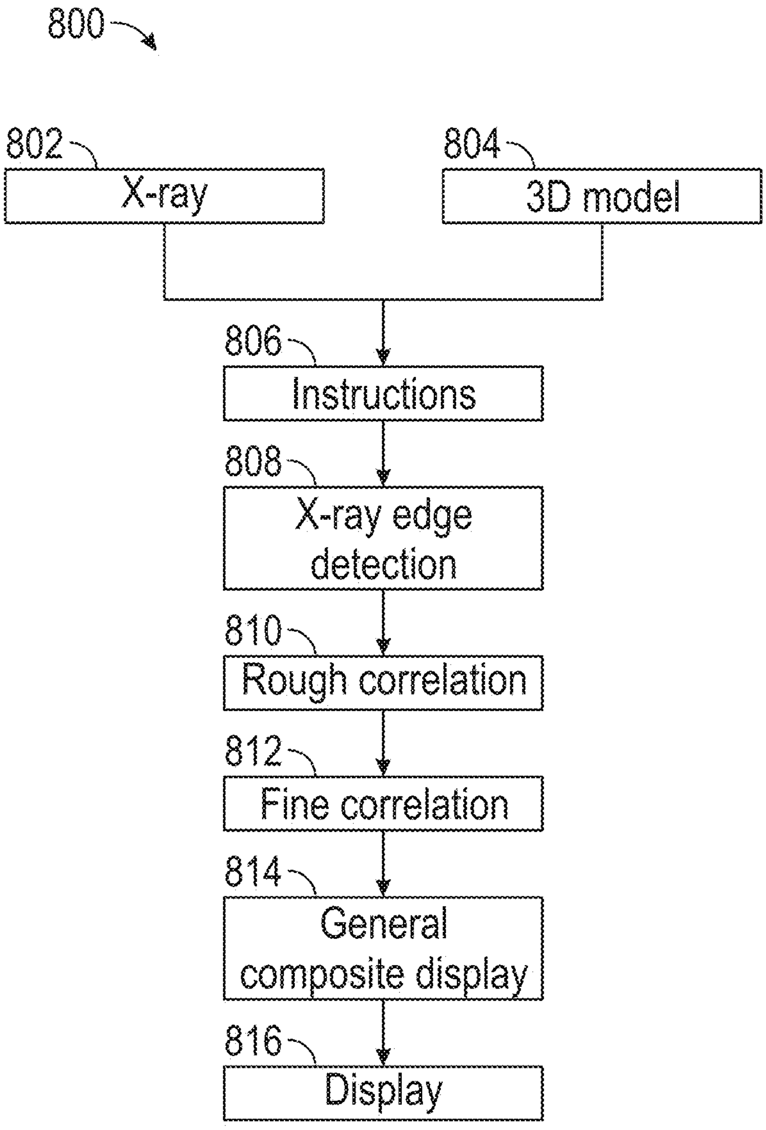
FIG. 8 is a flowchart of a method according to an embodiment of the invention.

FIG. 8 is a flow chart showing a process 800 according to embodiments of the invention. The process 800 can be performed using a computer system as described above. In steps 802 and 804, X-ray image data and three-dimensional scanning model of an oral area are obtained. In step 806, a user can provide instructions for generating a composite display and features of the composite display, for example, where the X-ray image(s) should be displayed relative to a three-dimensional model. The X-ray image(s) are correlated to the three-dimensional model by determining X-ray edges in step 808, determining a rough correlation in step 810 between the X-ray image(s) and the three-dimensional model, and determining a fine correlation in step 812 between the X-ray image(s) and the three-dimensional model, as described above. With the correlation, the composite display is generated at step 814, and the composite display is displayed to a user in step 816.

It should be noted that various steps of the method 800 can be performed in an order different than is depicted in FIG. 8. For example, the rough correlation step 810 could be performed before the x-ray edge detection 808.

Further aspects of the systems and methods described above may be implemented as an article of manufacture such as a non-transitory computer readable storage medium. The non-transitory computer readable storage medium may be readable by a computer and may comprise instructions for causing the computer to perform functions described herein. The non-transitory computer readable storage medium may be implemented by a volatile computer memory, non-volatile computer memory/storage, hard drive, solid-state memory, flash drive, removable disk and/or other media.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of embodiments of the invention and its practical applications, to thereby enable others skilled in the art to best utilize embodiments of the invention and various implementations with various modifications as are suited to the particular use contemplated.

The invention claimed is:

1. An apparatus comprising:

at least one processor configured to read out and execute instructions stored in at least one memory to thereby cause the apparatus to:

receive X-ray image data that was generated from an X-ray scan of an oral area of an individual and a three-dimensional model that was generated from a three-dimensional scan of the oral area of the individual; and generate a composite display of the oral area that includes a two-dimensional X-ray image generated from the X-ray image data projected onto a three-dimensional rendering generated from the three-dimensional model.

2. The apparatus according to claim 1, wherein the at least one processor is further configured to read out and execute instructions stored in the at least one memory to correlate the two-dimensional X-ray image and the three-dimensional model.

3. An apparatus according to claim 2, wherein the at least one processor is further configured to read out and execute instructions stored in the at least one memory to determine edges of structures in the two-dimensional X-ray image and determine edges of structures in the three-dimensional rendering of the three-dimensional model, and match the determined edges in the two-dimensional X-ray image to the determined edges in the three-dimensional rendering of the three-dimensional model.

4. The apparatus according to claim 3, wherein the at least one processor is further configured to read out and execute instructions stored in the at least one memory to (i) determine a subset of edges of the structures in the two-dimensional X-ray image that can potentially be matched to edges in the three-dimensional rendering of the three-dimensional model from amongst the determined edges of the structures in the two-dimensional X-ray image, (ii) determine a subset of edges of the structures in the three-dimensional rendering of a three-dimensional model that can potentially be matched to edges in the two-dimensional X-ray image from amongst the determined edges of the structures in the three-dimensional rendering of the three-dimensional model, and (iii) match edges in the subset of edges of the structures in the two-dimensional X-ray image to corresponding edges in the subset of edges of the structures in the three-dimensional rendering of the three-dimensional model.

5. The apparatus according to claim 4, wherein the at least one processor is further configured to read out and execute instructions stored in the at least one memory to determine a rough correlation of structures in the two-dimensional X-ray image to structures in the three-dimensional rendering of the three-dimensional model, and refine the rough correlation by matching edges in the subset of edges of the structures in the two-dimensional X-ray image to corresponding edges in the subset of edges of the structures in the three-dimensional rendering of the three-dimensional model.

6. The apparatus according to claim 5, wherein the at least one processor is further configured to read out and execute instructions stored in the at least one memory to refine the rough correlation by selecting points in the subset of edges of the structures in the three-dimensional rendering of a three-dimensional model and matching the selected points to closest corresponding points in the subset of edges of the structures in the two-dimensional X-ray image.

7. The apparatus according to claim 1, wherein the at least one processor is further configured to read out and execute instructions stored in the at least one memory to position the two-dimensional X-ray image relative to the three-dimensional model in the composite display such that the two-dimensional X-ray image is positioned in front of the oral area in the three-dimensional rendering of the three-dimensional model, within the oral area in the three-dimensional rendering of the three-dimensional model, or behind the oral area in the three-dimensional rendering of the three-dimensional model.

8. The apparatus according to claim 1, wherein the at least one processor is further configured to read out and execute instructions stored in the at least one memory to allow a user to adjust at least one aspect of the composite display.

9. The apparatus according to claim 8, wherein the at least one aspect is at least one of a transparency of the two-dimensional X-ray image in the composite display, a transparency of the three-dimensional rendering in the composite display, and positioning of the two-dimensional X-ray image relative to the three-dimensional rendering of the three-dimensional model in the composite display.

10. The apparatus according to claim 1, further comprising a display device configured to display the composite display.

11. A non-transitory computer readable storage medium configured to store a computer program comprising instructions for generating a composite display of an oral area, which when executed cause a computer system to:

receive X-ray image data generated from an X-ray scan of the oral area;

receive three-dimensional model generated from a three-dimensional scan of the oral area;

generate a composite display of the oral area that includes a two-dimensional X-ray image generated from the X-ray image data and a three-dimensional rendering generated from the three-dimensional model; and display the composite display.

12. A method of generating a composite display of an oral area, the method comprising:

receiving X-ray image data generated from an X-ray scan of the oral area;

receiving three-dimensional model generated from a three-dimensional scan of the oral area;

generating a composite display of the oral area that includes a two-dimensional X-ray image generated from the X-ray image data projected onto a three-dimensional rendering generated from the three-dimensional model; and displaying the composite display.

13. A method of generating a composite display of an oral area, the method comprising:

receiving X-ray image data generated from an X-ray scan of the oral area;

receiving a three-dimensional model generated from a three-dimensional scan of the oral area;

correlating a two-dimensional X-ray image generated from the X-ray image data and a three-dimensional rendering from the three-dimensional model such that structures in the two-dimensional X-ray image are matched to corresponding structures in the three-dimensional rendering;

generating a composite display of the oral area that includes the two-dimensional X-ray image projected on the three-dimensional model; and displaying the composite display.

14. The method according to claim 13, edges of structures in the two-dimensional X-ray image are determined and edges of structures in the three-dimensional rendering of the three-dimensional model are determined, the two-dimensional X-ray image is correlated to the three-dimensional rendering of the three-dimensional model by matching the determined edges in the two-dimensional X-ray image to the determined edges in the three-dimensional rendering of the three-dimensional model.

15. The method according to claim 14, wherein a subset of edges of the structures in the two-dimensional X-ray image that can potentially be matched to edges in the three-dimensional rendering of the three-dimensional model from amongst the determined edges of the structures in the two-dimensional X-ray image is determined, wherein a subset of edges of the structures in the three-dimensional rendering of the three-dimensional model that can potentially be matched to edges in the two-dimensional X-ray image from amongst the determined edges of the structures in the three-dimensional rendering of the three-dimensional model is determined, and wherein the subset of edges of the structures in the two-dimensional X-ray image are matched to corresponding edges in the subset of edges of the structures in the three-dimensional rendering of the three-dimensional model.

16. The method according to claim 15, wherein the correlation of the two-dimensional X-ray image and the three-dimensional model includes (i) making a rough correlation of structures in the two-dimensional X-ray image to the structures in the three-dimensional rendering of the three-dimensional model and (ii) refining the rough correlation by matching edges in the subset of edges of the structures in the two-dimensional X-ray image to the corresponding edges in the subset of edges of the structures in the three-dimensional rendering of the three-dimensional model.

17. The method according to claim 16, wherein the rough correlation is refined by matching points in the subset of edges of the structures in the three-dimensional rendering of the three-dimensional model to closest points in the subset of edges of the structures in the two-dimensional X-ray image.

18. The method according to claim 13, wherein the two-dimensional X-ray image is positioned relative to the three-dimensional model in the composite display such that the two-dimensional X-ray image is in front of the oral area in the three-dimensional model, within the oral area in the three-dimensional model, or behind the oral area in the three-dimensional model.

19. The method according to claim 13, further comprising adjusting at least one aspect of the composite display.

20. The method according to claim 19, wherein the at least one aspect is at least one of a transparency of the two-dimensional X-ray image in the composite display, a transparency of the three-dimensional model in the composite display, and positioning of the two-dimensional X-ray image relative to the three-dimensional model in the composite display.

* * * * *